US008596936B2

(12) United States Patent
McKenzie

(10) Patent No.: US 8,596,936 B2
(45) Date of Patent: Dec. 3, 2013

(54) APPARATUS FOR APPLYING LEVERAGE FORCE TO A HAND DRILL

(76) Inventor: George McKenzie, Brownvale (CA)

( * ) Notice: Subject to any disclaimer, the term of this patent is extended or adjusted under 35 U.S.C. 154(b) by 1059 days.

(21) Appl. No.: 12/569,035

(22) Filed: Sep. 29, 2009

(65) Prior Publication Data

US 2010/0080664 A1 Apr. 1, 2010

(30) Foreign Application Priority Data

Sep. 30, 2008 (CA) ...................................... 2640498

(51) Int. Cl.
*B23B 45/14* (2006.01)

(52) U.S. Cl.
USPC ............................................ 408/136; 408/76

(58) Field of Classification Search
USPC ..................................... 408/76, 92, 135, 136
IPC ....................................................... B32B 45/14
See application file for complete search history.

(56) References Cited

U.S. PATENT DOCUMENTS 1,097,709 A 5/1914 Fosselman
2,737,065 A 1/1953 Piersall
2,629,267 A 2/1953 Hart
2,667,092 A 1/1954 Schaffer
2,821,872 A 2/1958 Salfer
3,060,769 A * 10/1962 Heider ............................ 408/95
3,248,973 A 5/1966 Meyer
3,698,827 A 10/1972 Salfer
3,784,315 A 1/1974 O'Brien
3,834,828 A 9/1974 Kikuchi
5,322,397 A * 6/1994 Spear .............................. 408/99
5,346,334 A * 9/1994 Einaru et al. .................. 405/269
5,348,428 A * 9/1994 Turner ............................ 408/99
5,713,702 A 2/1998 Turner
5,863,158 A * 1/1999 Foshee et al. ................... 408/92
5,885,036 A 3/1999 Wheeler
5,890,851 A 4/1999 Hamilton
6,050,753 A * 4/2000 Turner ............................ 408/88
6,692,201 B2 2/2004 Soderman

FOREIGN PATENT DOCUMENTS

DE 24 32 137 1/1976
DE 3741644 A1 * 6/1989 ............. B23B 45/14

* cited by examiner

*Primary Examiner* — Daniel Howell
*Assistant Examiner* — Michael Vitale
(74) *Attorney, Agent, or Firm* — Davis & Bujold, PLLC; Michael J. Bujold

(57) ABSTRACT

An apparatus for applying a leverage force to a hand drill has a rigid elongated support having a first end and a second end. A travel member is movable axially along the support with a friction lock for locking the travel member to the support in a selected axial position. A lever is pivotally attached to the travel member. The lever has an engagement surface for engaging a spine of a hand drill, whereby a force is exerted upon the hand drill by means of the lever. A stop is positioned at the second end of the support to prevent axial movement of the support when a force is exerted by the lever.

10 Claims, 4 Drawing Sheets

APPARATUS FOR APPLYING LEVERAGE FORCE TO A HAND DRILL

FIELD

The present invention relates to an apparatus that is used to apply a force when using a hand drill.

BACKGROUND

U.S. Pat. No. 5,890,851 (Hamilton) discloses an apparatus for increasing hand drill pressure. The apparatus has an anchor line and a lever which slips over a handle on the hand drill.

SUMMARY

There is provided an apparatus for applying a leverage force to a hand drill has a rigid elongated support having a first end and a second end. A travel member is movable axially along the support with a friction lock for locking the travel member to the support in a selected axial position. A lever is pivotally attached to the travel member. The lever has an engagement surface for engaging a spine of a hand drill, whereby a force is exerted upon the hand drill by means of the lever. A stop is positioned at the second end of the support to prevent axial movement of the support when a force is exerted by the lever.

According to another aspect, there is provided a method for applying a leverage force to a hand drill, comprising the following steps: providing an apparatus as described above; hooking the stop foot behind a workpiece; moving the travel member axially along the support rod and locking the travel member in a position adjacent to the spine of the hand drill; and pivoting the lever to a position in which the engagement surface engages the spine of the hand drill and exerting a force upon the spine of the hand drill by means of the lever.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figures 1, 2:
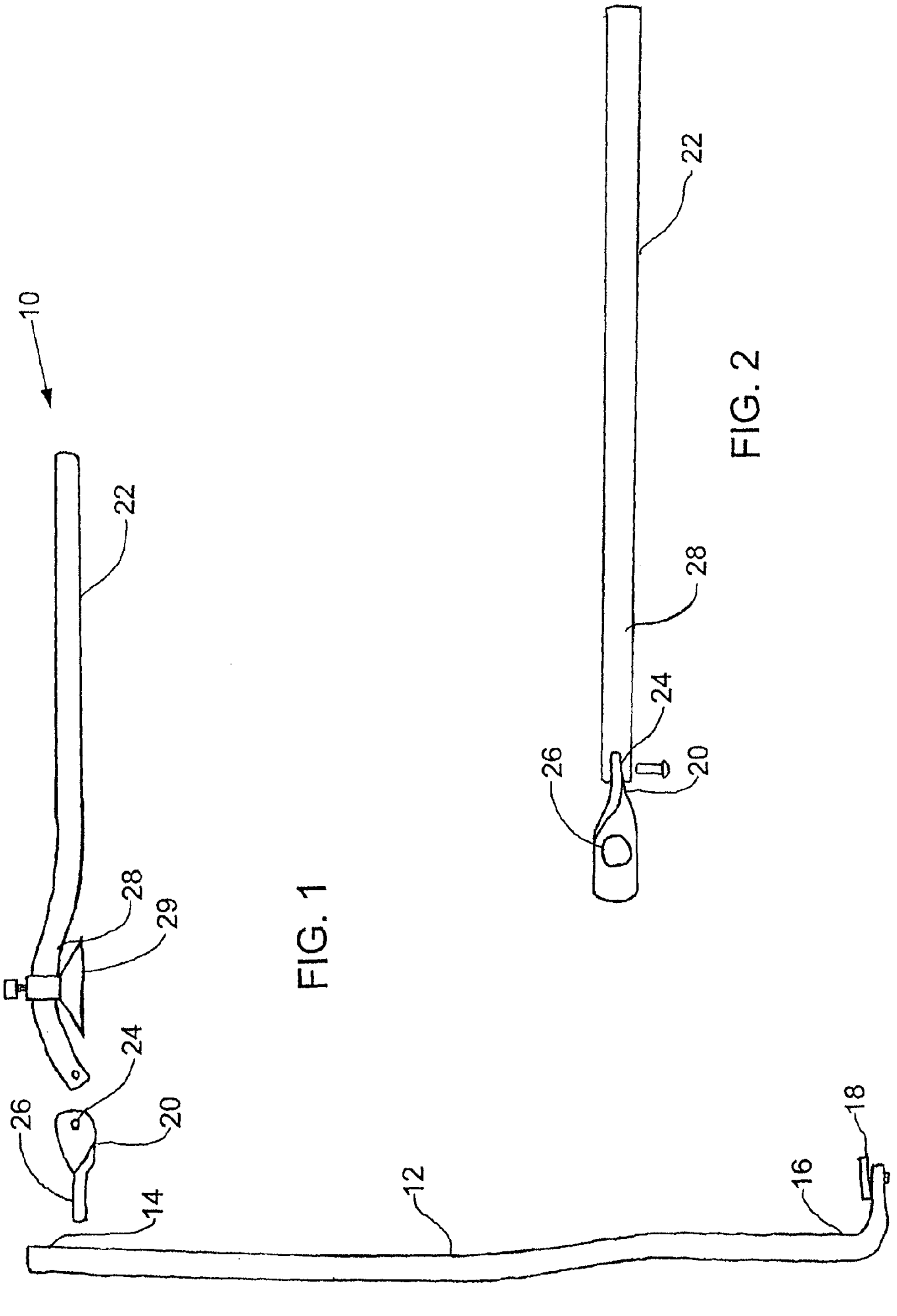
FIG. 1 is an exploded side elevation view of the apparatus for applying a leverage force to a hand drill.
FIG. 2 is a top plan view of the apparatus shown in FIG. 1.

An apparatus for applying a leverage force to a hand drill, generally identified by reference numeral 10, will now be described with reference to FIG. 1 through 6.

Structure and Relationship of Parts:

Referring to FIG. 1, apparatus 10 has a rigid elongated support 12 with a first end 14 and a second end 16. As shown, elongated support 12 is a rod. There is a travel member 20 that is axially movable along support 12. Travel member 20 is designed to be locked to support 12 in a selected axial position. For example, travel member 20 is pivotally attached to a lever 22 at a pivot point 24, and referring to FIG. 2, has a hole 26 that is intended to receive support 12. When an upward force is applied to pivot point 24, the orientation of hole 26 changes such that it clamps onto support 12. In this embodiment, there should be sufficient friction between inner surface of hole 26 and support 12 to generate a sufficient force to hold travel member 20 in place. Other locking means will be apparent to those skilled in the art.

In a preferred embodiment, travel member 20 is a twisted piece of flat metal, such that hole 26 receives elongate support 12, while the other end of travel member 20 is the proper orientation to attach to pivot point 24. Furthermore, instead of a sliding travel member 20, it will be understood that travel member 20 may also be a ratchet system, it may be secured by a clamp, or there may be a series of holes in elongate support 12 that are engaged by a pin or screw in travel member 20. However, by allowing travel member 20 to slide, it allows precise positioning that would not be otherwise possible, and as it is held in position by friction applied by an upward force on pivot point 24, or when lever 22 is depressed, it is quicker to set and remove from the desired position.

Referring to FIG. 1, lever 22 has an engagement surface 28, such as a crook in lever 22, for engaging a spine 30 of a hand drill 32. Hand drill 32 is preferably received within the crook of engagement surface 28 to hold the back of hand drill 32 in place. In some embodiments, an engagement component 29 may be removably attached to lever 22 for engaging the back of hand drills 32. Engagement component 29 preferably has a curved surface. Engagement components 29 is particularly useful with the usual design of most cordless drills. This arrangement of lever 22 also allows the user to hold hand drill 32 with one or both hands to prevent twisting. If both hands are used, lever 22 may be depressed with the user's body, such as under the arm. A force is exerted upon hand drill 32 by means of lever 22. A stop 16 is positioned at second end 16 of support 12 to prevent axial movement of support 12 when a force is exerted by lever 22. As shown, stop 16 is a projecting foot 18. Preferably, stop foot 18 is magnetic to improve the stability when drilling metallic objects. Projecting foot 18 is preferably rotatably connected to stop 16 and thus to support 12 to allow elongate support 12 to be adjusted once foot 18 has been attached. If stop foot 18 is magnetic, this allows stop foot 18 to help secure elongate support 12 in the desire location while the rest of apparatus 10 is arranged.

Figure 3:
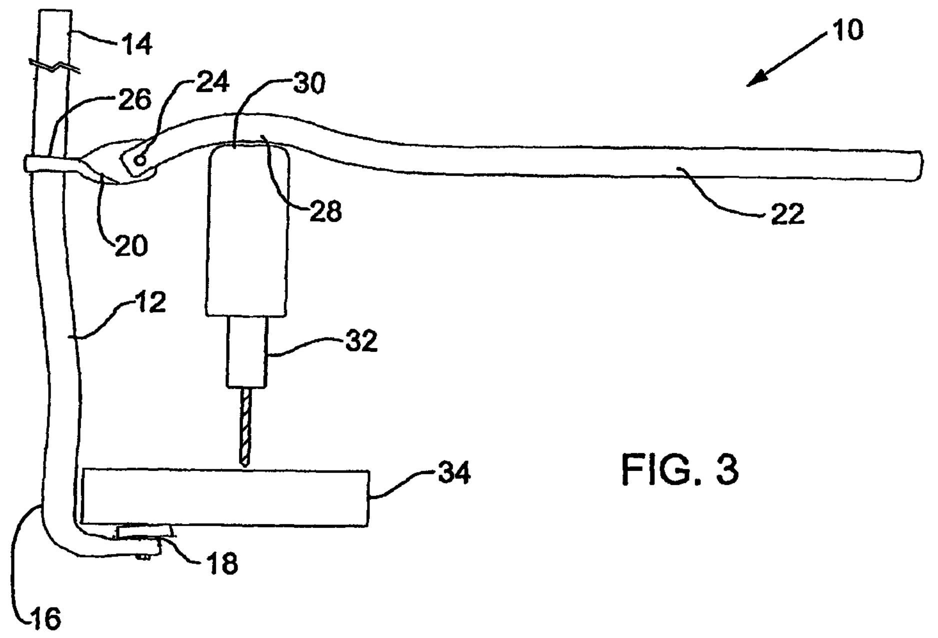
FIG. 3 is a side elevation view of the apparatus shown in FIG. 1 applying a force to a hand drill.
Figure 4:
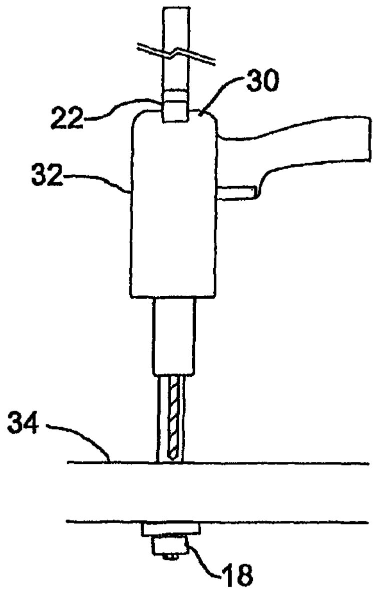
FIG. 4 is a front elevation view of the apparatus shown in FIG. 1 applying a force to a hand drill.

Engagement surface 28 may engage hand drill 32 at various locations, depending on the circumstances of use and the type of drill being used. Preferably, engagement surface 28 is positioned such that a downward force applied to lever 22 is applied directly to a drill bit 29. In addition to what is shown in FIGS. 3 and 4, engagement surface 28 may also engage the handle of a drill, the stabilizing handle of a hammer drill, or any other convenient location.

Figure 5:
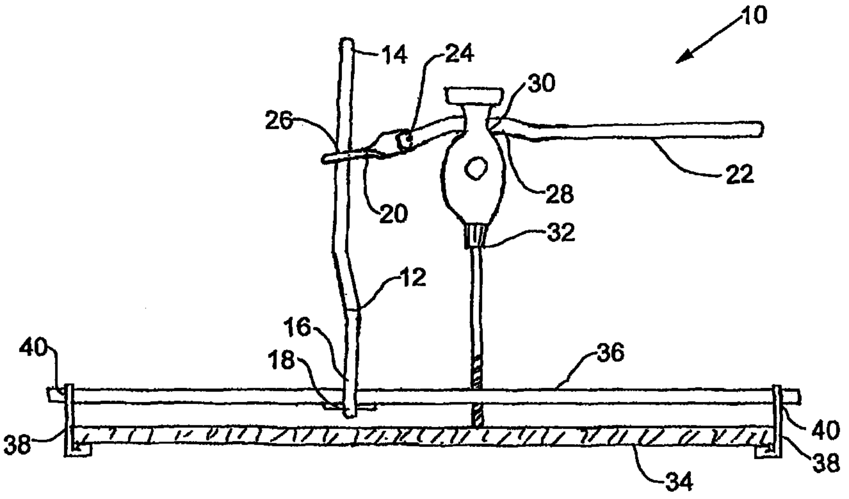
FIG. 5 is a side elevation view of the apparatus shown in FIG. 1 using workpiece clamps.

It will be understood that stop 16 may take various forms. For example, there are circumstances where it is not convenient or not possible to have stop foot 18 attach below the workpiece 34 being drilled and obtain the desired drilling position. Referring to FIG. 5, an anchor bar 36 that traverses workpiece 34 may be provided. Workpiece clamps 38 are positioned at each end of anchor bar 36 that attach to workpiece 34. Each workpiece clamp 38 has a bar receiver 40 that receives anchor bar 36. Preferably, bar receiver 40 is open on both ends to permit clamps 38 to be attached to workpieces of various lengths without having to use a different anchor bar 36. Clamps 38 may have magnets that secure them to workpiece 34, or may be actual clamps that are tightened on to workpiece 34.

Figure 6:
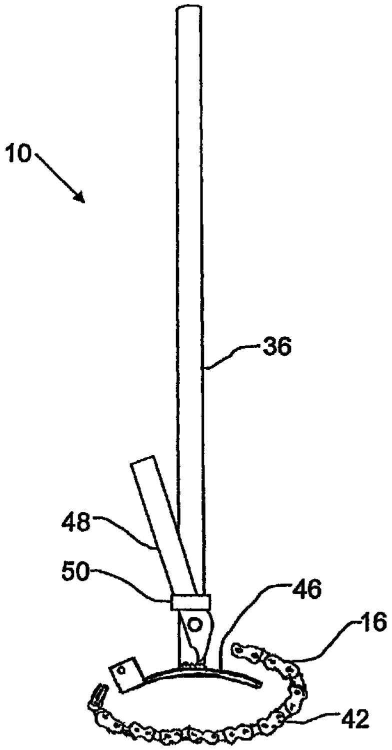
FIG. 6 is a side elevation view of an alternative elongated support and stop.

Alternatively, referring to FIG. 6, stop 16 may be a belt connector, such as a chain 42 as shown, that is used to wrap around a workpiece to be drilled. This is particularly useful for objects that may be round or otherwise awkward to engage with the components described above. Chain 42 preferably overlaps plate 46 above anchor bar 36 to improve its stability when on a vertical object. It will be understood that the length of chain 42 may be extended to encompass larger objects. As shown, stop 16 also includes a plate 46 to improve the stability of anchor bar 36. Anchor bar 36 has a lever arm 48 that engages the links of chain 42 to tighten it into place, while a locking ring 50 holds that is held against workpiece 44. It will be understood that chain 42 need on be directly attached to anchor bar 36, but may be tightened over plate 46 to hold it in place. Furthermore, any belt connector used must be strong enough to provide sufficient stability under the anticipated forces that are to be applied during use. Other methods of securing support 12 will be recognized by those skilled in the art, depending on the circumstances.

Operation:

Referring to FIG. 1, a method for applying a leverage force to a hand drill begins by providing apparatus 10 as described above. Referring to FIG. 3, stop foot 16 is hooked behind workpiece 34. If workpiece 34 is magnetic, it may be preferable to provide a magnetic stop foot 16 to increase its stability. Travel member 20 is moved axially along support rod 12, and positioned adjacent to spine 30 of hand drill 32. Lever 22 is then pivoted to a position in which engagement surface 28 engages spine 30 of hand drill 32 and exerts a force upon spine 30 of hand drill 32 by means of lever 22. As lever 22 is pushed downward, travel member 20 is locked into place as it is pulled upward at pivot point 24. Once locked, travel member 20 becomes the fulcrum to obtain a mechanical advantage in applying a force to hand drill 32. The actual advantage will vary depending on the length of lever 22, and the location of engagement surface 28 along lever 22, but is preferably about 4 or 5 times the actual downward force applied to lever 22.

Alternate steps may be taken in circumstances where it is not convenient or not possible to hook stop foot 16 behind workpiece 34 to obtain the desired drilling position. Referring to FIG. 5, workpiece clamps 38 are clamped to opposed sides of workpiece 34. Anchor bar 36 is positioned in anchor bar receiver 40 of each workpiece clamp 38 with anchor bar 36 extending between workpiece clamps 38 in a position traversing workpiece 34. Then, instead of stop foot 16 engaging work piece 34, stop foot 16 engages anchor bar 36. The method then continues as described above.

Advantages:

In the preferred embodiment, there are no clamps to set or attachments to be made when preparing for use, unless workpiece clamps 38 are used. This allows apparatus 10 to be relatively easy to adjust, as well as being relatively flexible and quick to setup. For example, if multiple holes are required, it is a simple matter to slide support 12 to the next position to drill once one hole has been completed, without any clamps or attachments to remove.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. An apparatus for applying a leverage force to a hand drill, the apparatus comprising:
- a rigid elongated support having a first end and a second end;
- a travel member movable axially along the support;
- a lever pivotally attached to the travel member, the lever having an engagement surface, spaced from the travel member along the lever, for directly engaging a spine of a hand drill, whereby a force is exerted upon the hand drill by the lever;
- a locking device for locking the travel member to the support in a selected axial position, the locking device comprising a hole that is larger than the elongated support, and the hole pivoting to frictionally engage the elongated support when a force is applied to the lever; and
- a stop positioned at the second end of the support to prevent axial movement of the support when a force is exerted by the lever.

2. The apparatus of claim 1, wherein the elongated support is a rod and the stop is a projecting foot.

3. The apparatus of claim 2, wherein the foot is magnetic.

4. The apparatus of claim 1, wherein the engagement surface is a crook in the lever.

5. The apparatus of claim 1, in combination with an anchor bar that traverses a workpiece.

6. The apparatus of claim 5, wherein a workpiece clamp is positioned at each end of the anchor bar, each workpiece clamp having a bar receiver that receives the anchor bar.

7. The apparatus of claim 1, wherein the stop comprises a belt connector.

8. An apparatus for applying a leverage force to a hand drill, the apparatus comprising:
- an elongated support rod having a first end and a second end;
- a travel member movable axially along the support;
- a lever pivotally attached to the travel member, the lever having a crook that serves as an engagement surface for directly engaging a spine of a hand drill, the crook being spaced from the travel member along the lever, whereby a force is exerted upon the hand drill by the lever;
- a locking device for locking the travel member to the support in a selected axial position, the locking device comprising a hole that is larger than the elongated support, and the hole pivoting to frictionally engage the elongated support when a force is applied to the lever; and
- a stop foot positioned at the second end of the support to prevent movement of the support when a force is exerted by the lever.

9. A method for applying a leverage force to a hand drill, the method comprising the steps of:
- providing an apparatus comprising:
  - an elongated support rod having a first end and a second end;
  - a travel member movable axially along the support rod;
  - a lever pivotally attached to the travel member, the lever having an engagement surface spaced from the travel member along the lever for directly engaging a spine of a hand drill, whereby a force is exerted upon the hand drill by the lever;
  - a locking device for locking the travel member to the support rod in a selected axial position, the locking device comprising a hole that is larger than the elongated support, and the hole pivoting to frictionally engage the elongated support when a force is applied to the lever; and a stop foot positioned at the second end of the support rod to prevent axial movement of the support rod when a force is exerted by the lever;

hooking the stop foot behind a workpiece;

moving the travel member axially along the support rod and locking the travel member in a position adjacent to the spine of the hand drill;

pivoting the lever to a position in which the engagement surface engages the spine of the hand drill and exerting a force upon the spine of the hand drill by means of the lever.

10. A method for applying a leverage force to a hand drill, the method comprising the steps of:

providing an anchor bar assembly and a lever apparatus, the lever apparatus comprising:

an elongated support rod having a first end and a second end;

a travel member movable axially along the support rod;

a lever pivotally attached to the travel member, the lever having an engagement surface spaced from the travel member along the lever for directly engaging a spine of a hand drill, whereby a force is exerted upon the hand drill by the lever;

a first locking device for locking the travel member to the support rod in a selected axial position, the locking device comprising a hole that is larger than the elongated support, and the hole pivoting to frictionally engage the elongated support when a force is applied to the lever; and a second locking device for engaging an anchor bar positioned at the second end of the support rod to prevent axial movement of the support rod when a force is exerted by the lever;

the anchor bar assembly comprising:

an anchor bar and a pair of workpiece clamps, each workpiece clamp having an anchor bar receiver to receive the anchor bar;

clamping the workpiece clamps to opposed sides of a workpiece;

positioning the anchor bar in the anchor bar receiver of each workpiece clamp with the anchor bar extending between the workpiece clamps in a position traversing the workpiece;

engaging the second end of the support rod and the anchor bar;

moving the travel member axially along the support rod and locking the travel member in a position adjacent to the spine of the hand drill;

pivoting the lever to a position in which the engagement surface engages the spine of the hand drill and exerting a force upon the spine of the hand drill by means of the lever.

* * * * *